Figure 1:
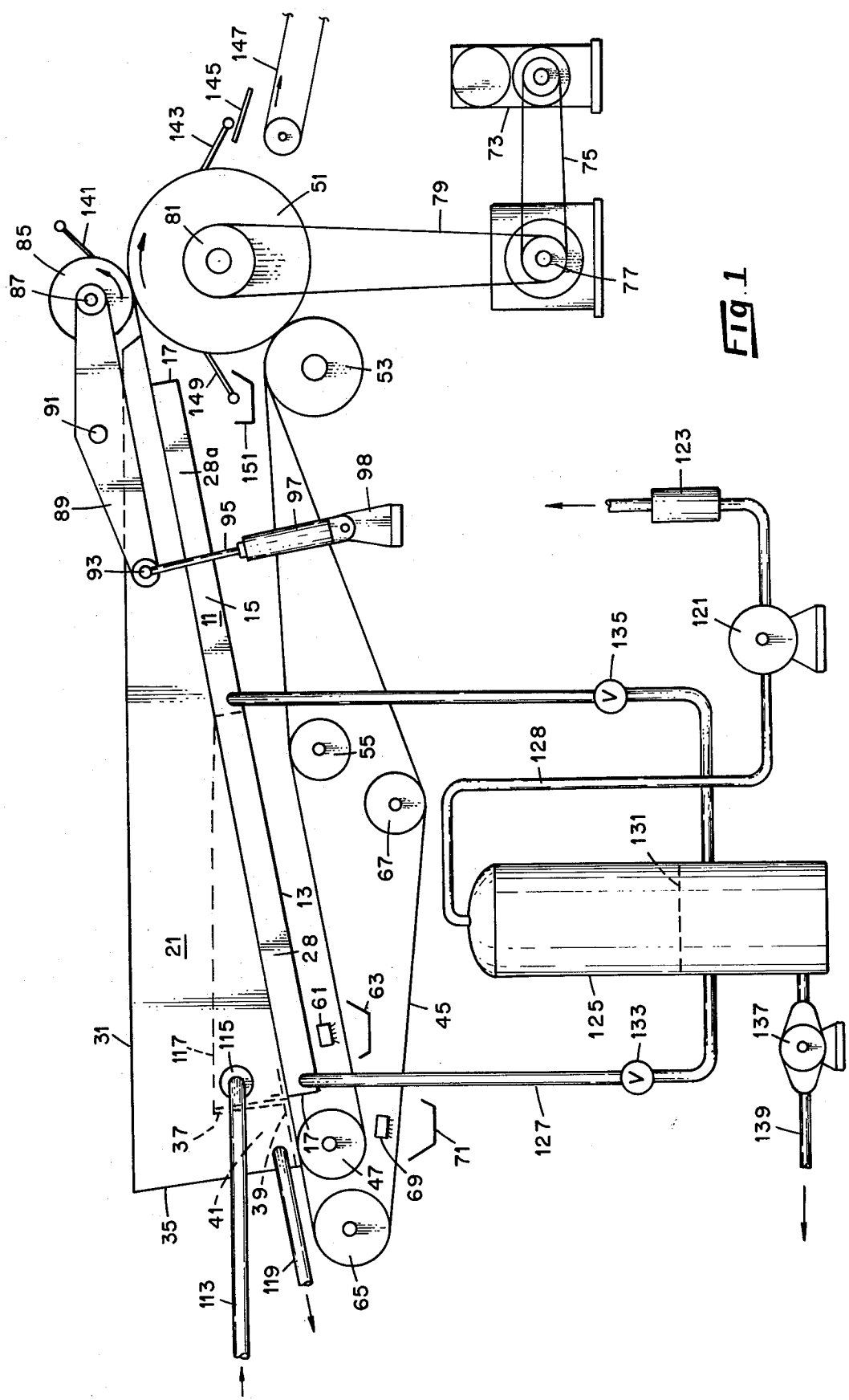

United States Patent [19]

Lee

[11] 4,285,816
[45] Aug. 25, 1981

[54] DEWATERING SYSTEM

[75] Inventor: Charles A. Lee, Knoxville, Tenn.

[73] Assignee: Fairchild, Incorporated, Beckley, W. Va.

[21] Appl. No.: 127,186

[22] Filed: Mar. 4, 1980

[51] Int. Cl.³ .............................................. B01D 33/04
[52] U.S. Cl. .................................................... 210/401
[58] Field of Search ........................ 210/400, 401, 450

[56] References Cited

U.S. PATENT DOCUMENTS

| | | | |
|---|---|---|---|
| 712,347 | 10/1902 | Wheelwright | 210/400 |
| 2,097,529 | 11/1937 | Hordell | 210/198 |
| 2,185,868 | 1/1940 | Schaefer | 210/401 |
| 2,488,700 | 11/1949 | Bidwell | 92/44 |
| 3,049,236 | 8/1962 | Lara et al. | 210/68 |
| 3,453,951 | 7/1969 | McLarkey, Jr. | 100/118 |
| 3,464,557 | 9/1969 | Fowler | 210/401 X |
| 3,506,128 | 4/1970 | Pashaian et al. | 210/400 |
| 3,677,411 | 7/1972 | Ishigaki | 210/401 X |
| 3,756,411 | 9/1973 | Kracklauer | 210/401 X |
| 3,796,317 | 3/1974 | Lippert et al. | 210/386 |
| 3,933,634 | 1/1976 | Seki | 210/46 |
| 4,137,062 | 1/1979 | Mullerheim | 210/401 X |
| 4,145,288 | 3/1979 | Crowe | 210/401 X |

*Primary Examiner*—Frank A. Spear, Jr.

[57] ABSTRACT

A system for separating solids from a slurry containing liquids and solids including an elongated plate having spaced apart openings therethrough, a pair of superposed endless screens supported for sliding movement on the upper surface of the plate. A pond of the slurry is formed over a portion of the run of the screens. A vacuum chamber is provided on the side of the plate opposite the side supporting the screens to draw liquid from the pond through the screens. A roll nip is provided to engage the screens to apply pressure to material on the screens at the nip. Various screen constructions and operating parameters are also disclosed.

9 Claims, 5 Drawing Figures

DEWATERING SYSTEM

The present invention relates, generally, to a dewatering system and, in particular, to a dewatering system which is particularly adaptable to dewater materials at a relatively high rate and which is adapted to provide dewatered material which is of relatively low moisture content.

In many fields, it is necessary to dewater suspended solids. This presents a particular problem in cleaning up waste water which contains substantial amounts of suspended solids which cannot be readily disposed of if they contain excess moisture. Examples of such suspended solids which present a problem are the solids contained in the effluents from coal washing processes, from the canning industry; from papermaking process and many others. In such operations it is desired to obtain solid materials which can be recovered or disposed of in a land fill or the like, but which are not readily recoverable or disposable if they contain excess water.

As a more specific example, the problem is particularly acute in the coal industry where coal is washed after mining and the wash water contains substantial amounts of coal fines and/or finely divided refuse which has been separated from the coal. Because of the fine particles which are present, screens and filters tend to clog which makes filtering impractical because of the slow filtering rate and the filter cake which results in excessively high in moisture. A typical coal washing effluent contains between about eight and fifteen percent solid materials. With the technology which has been used in the past, the wash water containing the solids is run into settling basins where the solids gradually settle and the clarified water is withdrawn for reuse.

Because of the large volume of wash water and solids, large ponds are required and these ponds are susceptible to overflow which can harm the surrounding area. The settled out solids are periodically removed with a dragline or the like and dried, hauled away, and piled up at substantial expense. In the absence of removal and drying it takes months and even years for the water to evaporate to a sufficient degree that the bed of the pond is stable and is not subject to run off. This characteristic of the settled materials causes them to leak from the trucks thus despoiling the area and provides unsightly piles of slop.

Figure 2:
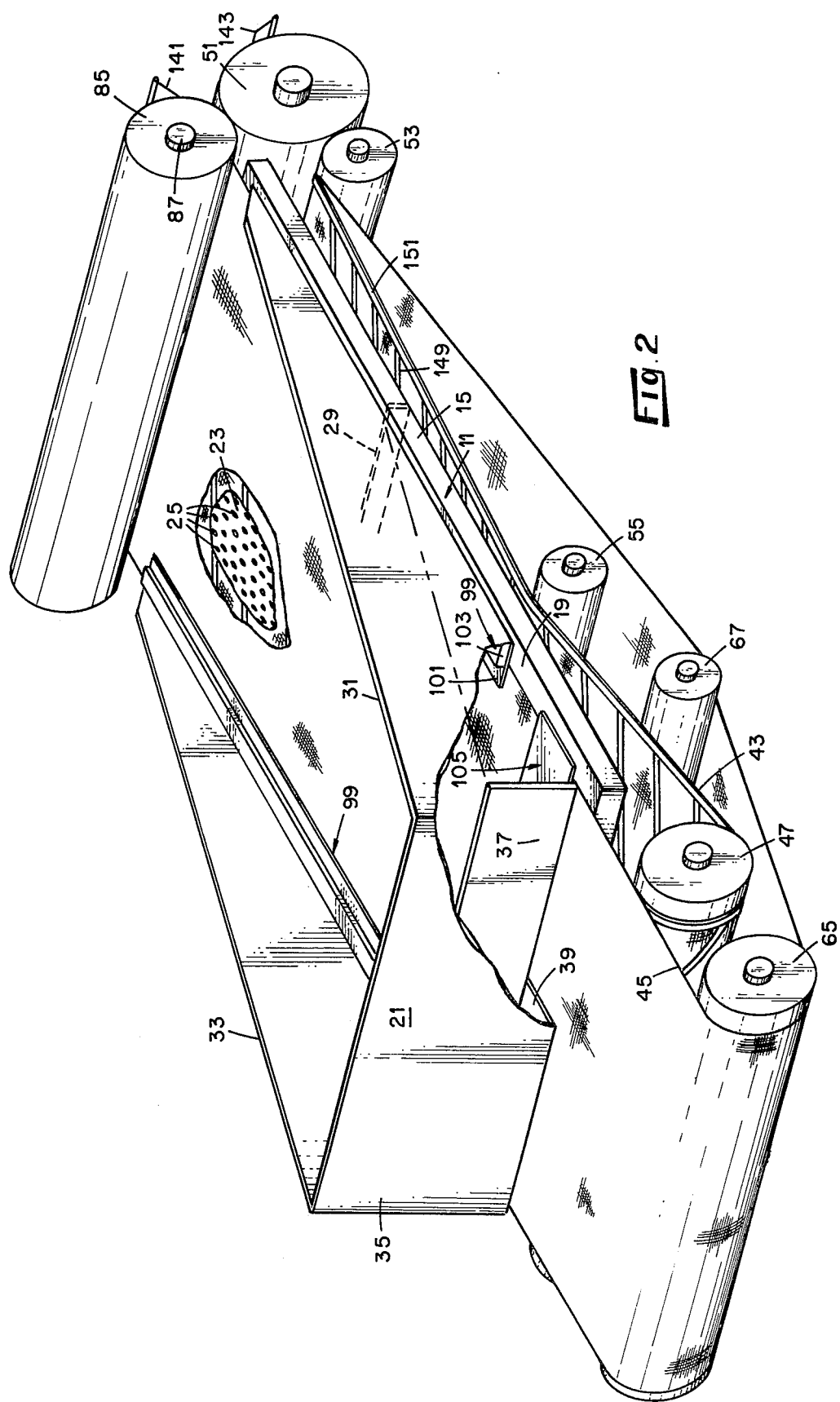
Figure 3:
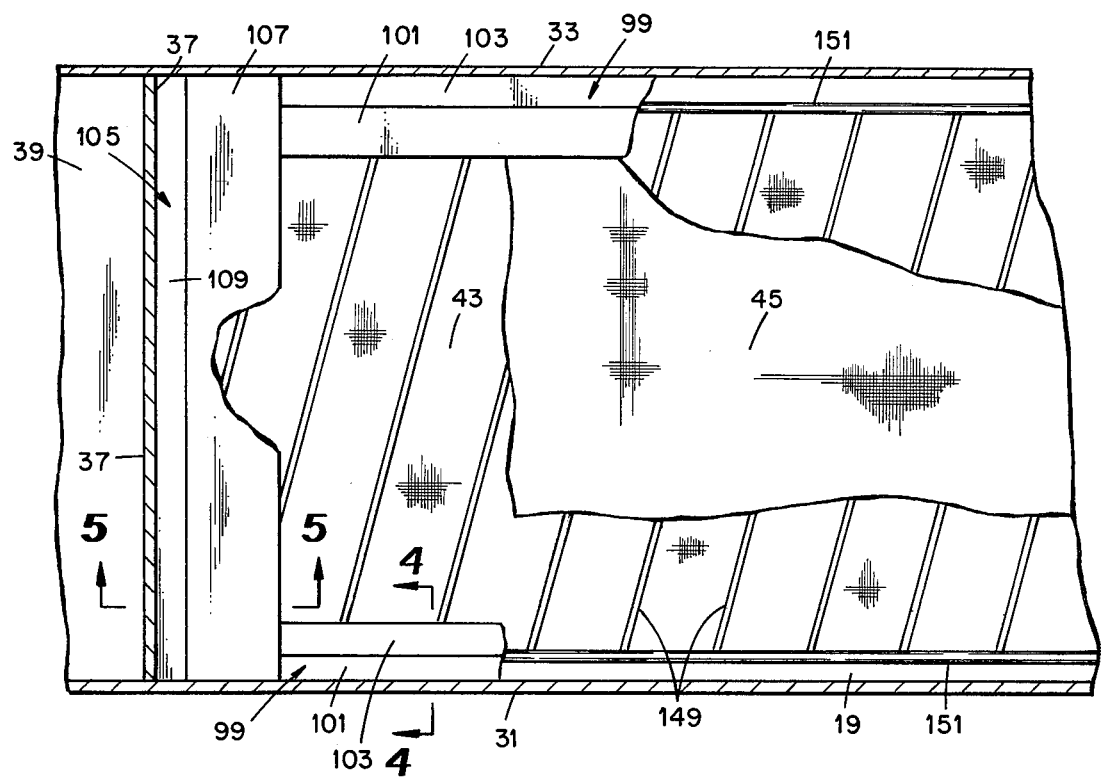
Figure 4:
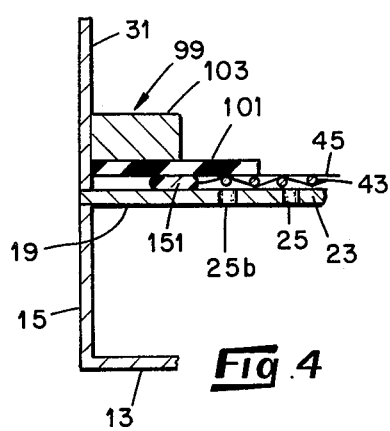
Figure 5:
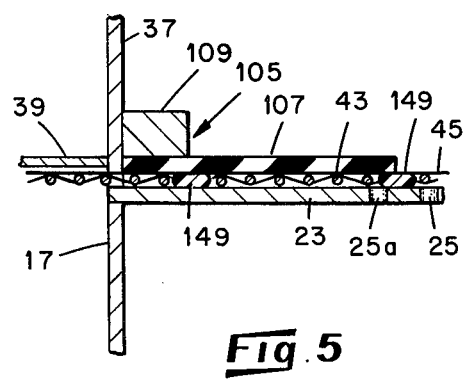

Accordingly, it is the principal object of this invention to provide a system which can be employed to dewater effluents containing substantial amounts of suspended solids and which provides a dewatered solid which is sufficiently dry to be disposed of in an economical manner as well as a filtrate which is sufficiently low in solids so that they can be cycled back for use as process water. It is a specific object of the invention to provide a system for dewatering coal and refuse solids from a coal washing process effluent in an economical manner. Other objects and advantages of the invention will become known by reference to the following description and the appended drawings in which:

FIG. 1 is a diagrammatic view of apparatus embodying various of the features of the invention, FIG. 2 is a fragmentary perspective view, partially in section, of the dewatering section of the apparatus shown in FIG. 1, FIG. 3 is a plan view, partially in section, of the belt arrangement which forms a part of the apparatus of FIGS. 1 and 2, FIG. 4 is a sectional view taken along line 4—4 in FIG. 3, and FIG. 5 is a sectional view taken along line 5—5 in FIG. 3.

In general, a system embodying various features of the invention involves forming a pond of the slurry to be dewatered over one end of a pair of contiguous, overlying, foraminous screens, the other end of which extends out of the pond. The screens are supported on a supporting surface having openings therein and a vacuum is applied to the underside of the surface. The screens are moved in unison over the surface through the pond while applying vacuum to the underside of the surface. The screens have different sized openings, the uppermost screen being of relatively fine mesh which has a low void volume and the lower screen being of relatively coarse mesh which provides supporting knuckles. The vacuum effects a flow of liquid through the screens while the screens are submerged in the pond to form a cake of solids contained in the slurry. The vacuum also causes the flow of air through the cake after the screens emerge from the pond to remove additional water. Thereafter, the screens and the cake carried thereby are passed between a pair of pressure rolls which causes additional liquid to be pressed from the cake whereupon it runs through the two screens to a collection point. The cake is then doctored from the pressure rolls and the screens and is disposed of in any suitable manner. The screens are then cleaned and recycled to the pond.

Preferably, as will be pointed out, the vacuum is applied to the underside of the supporting surface in two separate, defined areas, one being in the area where the screens are disposed in the pond and the other area being where the screens have emerged from the pond. This permits a difference in flow through the screens in the separate areas which permits control of the dewatering action and the volume of air passing through the cake once it is removed from the pond.

In order to maximize the utilization of the vacuum a vacuum seal means is provided to insure that the slurry does not bypass the screens and that the vacuum effects maximum flow through the cake rather than around it.

In the following paragraphs the system will be described as well as its operation and, thereafter, the parameters employed in the system for filtering coal fines and coal refuse will be described.

An apparatus for carrying out various of the features of the invention is schematically illustrated in the drawings. The apparatus includes a vacuum box 11 which is fabricated in a generally rectangular shape and which is inclined at an acute angle to the horizontal. Preferably, the vacuum box 11 is inclined to the horizontal at an angle of from about 15° to 30°. The vacuum box 11 includes an inperforate bottom wall 13, imperforate side walls 15 which are attached to and extend upwardly from the bottom wall 13 and end walls 17 which are similarly attached to the bottom wall 13 and extend upwardly therefrom. The juncture between the side walls 15, end walls 17 and the bottom wall 13 are sealed in any suitable manner.

Around the upper edge of the end and side walls 17 and 15, there is provided an inwardly disposed flange 19 which is spaced from the bottom wall 13 of the vacuum box 11 and which provides a substantially plane surface.

The plate 23 is perforated or slotted over substantially its entire area, as indicated at 25, to permit the passage of air and water therethrough. Preferably, the vacuum box 11 is divided into two or more sections. In the illustrated device the vacuum box 11 is divided into two sections 28 and 28a by an imperforate partition 29.

As illustrated in the drawings, the slurry box 21 is attached to the flanges 19 and comprises upstanding side wall members 31 and 33, and a rearward wall 35. Spaced from the rearward wall 35 within the slurry box a partition 37 is provided which serves as a weir to control the level of liquid in the slurry box 21. Between the partition 37 and the bottom of the rearward wall 35 there is provided a bottom member 39, the rearward wall 35, the side walls 31 and 33 and the partition which forms the weir, thus providing a sump 41 for the collection of excess liquid.

As illustrated in the drawings, two endless foraminous screens 43 and 45 are provided, the upper runs of which are superposed and supported for sliding movement along plate 23. The upper run of lowermost screen 43 is supported on the plate 23 and the upper run of the uppermost screen 45 is supported on the screen 43.

The downstream end of the lowermost screen 43 is trained around a roll 47, and over the plate 23, as illustrated, whereupon it is trained around a drive roll 51 and over a wrap roll 53 which maintains the proper wrap of the screen around the drive roll 51 insure proper contact between the screen and roll 51. From the roll 53 the screen 43 passes over a guide roll 55 and returns to the roll 47. Intermediate the roll 47 and the guide roll 55 there is provided a spray head 61 which is connected to a suitable source of wash water for the screen 43, the water being collected in a trough 63 which is positioned below the screen 43.

The upper screen 45 is supported upon a roll 65 which is positioned downstream of the roll 47, the screen 45 running over and in contact with the screen 43 which is supported upon the plate 23. The screen 45 also passes around the drive roll 51 and the wrap roll 53 in contact with the screen 43 whereupon it is separated from the screen 43 and passes around a guide roll 67 and back to the roll 65. Intermediate the guide roll 67 and the roll 65 there is provided a spray head 69 which is connected to a suitable source of wash water, the water being collected in trough 71 below the screen 45.

Power for the drive roll 51 is provided in the illustrated apparatus by a motor and speed reducer 73 which is connected by a suitable power transmission means such as the belt 75 or the like to a pulley 77. Concentric with and attached to the pulley 77 is a second pulley (not shown) which is connected by means of a belt or the like 79 to a pulley 81 on the shaft 83 of the drive roll 51. Thus, power from the motor-speed reducer 73 is transmitted to the drive roll 51 which in turn pulls both the screens 43 and 45 simultaneously over the surface of the plate 23. Proper tension may be maintained in the screens 43 and 45 by longitudinally adjusting the position of the rolls 47 and 65 by any suitable means.

In order to apply pressure to materials on the screens 43 and 45, a press roll 85 is provided which is biased towards the screens 43 and 45 at a point at which they are supported by the drive roll 51. The press roll 85 is positioned rearwardly (based upon the direction of rotation of the roll 51) from the uppermost point of the drive roll 51 so that liquid passing through the screens 43 and 45 will run down the surface of the drive roll 51 counter to its direction of rotation. The press roll 85 is supported upon shaft 87 which is in turn supported on one end of a pair of arms 89 which are pivotally supported intermediate their ends on a pivot 91. The other end of each arm is connected by means of a suitable pivot pin 93 to the piston rod 95 of a hydraulic cylinder 97 which is attached to a suitable support 98. Thus, under actuation of the hydraulic cylinders 97, the desired pressures can be applied between the press roll 85 and the drive roll 51.

In order to provide seals between the screens 43 and 45 and the slurry box 21, a side seal 99 is provided along each of the lower portions of the side walls 31 and 33 of the slurry box 21. The side seals comprise strips 101 of flexible material such as rubber, plastic or the like, which bridge an area inwardly of the marginal edges of the screens 43 and 45 and the flange 19. The flexible strip 101 is mounted on an inwardly directed flange 103 attached to each of the side walls 31 and 33.

A similar flexible seal 105 is provided at the upstream end (relative to the direction of movement of the screens) of the screens 43 and 45 in the slurry box 21 adjacent the partition 37. The seal 105 is also provided by a flexible strip 107 of rubber, plastic or like material which is attached to the inner surface of the partition 37 by means of a mounting flange 109.

In order to supply the slurry to be dewatered to the apparatus, a delivery conduit 113 is provided which is directed to a fitting 115 in the side wall 31 of the slurry box 21. Preferably, in order to minimize agitation, the slurry is introduced into the slurry box 21 downstream of the partition 37 under the liquid level which is indicated in FIG. 1 by the dotted line 117. Any excess slurry, which is not discharged from the apparatus either in the form of liquid or solid, runs over the weir provided by the partition 37 and flows into the sump 41 defined by the upstream wall 35 of the slurry box, the bottom member 39 and the partition 37. The sump 41 is connected by means of a conduit 119 back to the source of slurry so that it can be recycled into the slurry box 21.

Vacuum is provided for the system by a vacuum pump 121 which exhausts to the atmosphere through the muffler 123 as illustrated. In order to minimize the amount of power required to form the vacuum, the vacuum pump is connected to the upper end of a liquid separator 125 which is disposed below the level of the vacuum box 11. Connections are made to each of the sections 28 and 28a of the vacuum box 11 by means of conduits 127 and 129, respectively, which enter the separator 125 at a level below the liquid level 131, as shown. Suitable valves 133 and 135 are provided in the conduits 127 and 129, respectively, to control the degree of vacuum. Liquid is removed from the lower portion of the separator 125 by means of a pump 137 and is conducted either to further processing operations or back to some other point for utilization through the conduit 139.

By locating the liquid separator 125 at a level well below the vacuum box 11, the columns of liquid in the conduits 127 and 128 will aid in reducing the pressure in the vacuum box 11 so that the power requirements of the unit are minimized.

Removal of solids is effected by means of a doctor blade 141 which bears against the press roll 85 and a doctor blade 143 which bears against the screens of the drive roll 51. Any solids from the doctor blade 141 fall onto the screens below the doctor blade 141 and are carried by the drive roll 51 to doctor blade 143 from which they are deposited on a chute 145 which deposits the solids on a conveyor belt 147. Liquid which is removed by the press roll 85 flows through the screens 43 and 45 and down the surface of the drive roll 51 where it is removed by a doctor blade 149 and is collected in a trough 151.

In operation, the drive roll 51 is activated to draw the screens 43 and 45 over the plate 23. The cleaning showers 61 and 69 are activated to provide a cleaning shower for their respective screens. A pond of slurry is established in the lower portion of the slurry box, the level of slurry being maintained at the level 117 by the weir provided by the partition 37. As indicated, the slurry level preferably extends to a point beyond the center partition 29 to insure that the lower vacuum box section 28 is covered by liquid.

The vacuum system is activated through the action of the vacuum pump 121 and the liquid pump 137 to maintain the liquid level in the separator 125 above the inlets to the separator of conduits 127 and 129.

In the section 28 of the vacuum box 11, the vacuum causes liquid to flow through the perforations in the plate 23 into the vacuum box section 28 from which it is carried by the conduit 127 into the separator 125. The pump 137 then pumps the liquid to a point of utilization or disposal. The course screen 43 provides passageways for the liquid which flows through the fine screen 45 to reach the perforations 25 in the plate 23 so as to minimize pressure drops which would reduce the effectiveness of the vacuum. Flow through the screens in the area of section 28 of the vacuum box 11 is controlled by the valve 133.

As the liquid is drawn through the screens, a cake of solid materials is formed on the screen 45 which progressively moves toward and over the section 28a of the vacuum box 11. In this area, the cake of material on the belt 45 is subjected to a flow of air caused by the vacuum system which sweeps liquid from the cake of solids, the air and entrained liquid flowing through the screen 45, the screen 43 and thence through the perforations 25 in the plate 23. The liquid and air which are drawn through section 28a pass through conduit 129 to the separator 125. In the separator, the air is drawn out by means of the vacuum pump 121 and the liquid fraction is drawn out by the pump 137.

After leaving the vacuum box 11, the screens 45 and 43 and the cake of solids carried thereby moves to the nip formed between the drive roll 51 and the press roll 85. By applying a suitable amount of hydraulic pressure to the cylinders 97, the desired pressure is developed in the nip. As has been pointed out above, the nip between the rolls 85 and 51 is located upstream from the uppermost point of the roll 51 so that any liquid flowing through the screens 45 and 43 runs down the surface of the roll 51 where it is doctored from the roll 51 by the doctor blade 145 for collection in the trough 151.

In operation, the material entering the nip between the rolls 85 and 51 shows a buildup of material ahead of the nip which effects a working of the material before it passes through the nip. The solid materials which pass through the nip are removed from the roll 85 by the doctor blade 141, that material falling onto the screen 45 carried by the roll 51. Solid materials from the screen 45 are removed from the screen by the doctor blade 143 and fall onto the chute 145 which deposits then on the conveyor belt 147 for disposal or reuse.

The screens 45 and 43 are carried around the roll 51 and over the wrap roll 153 at which point they are separated, washed and return to the slurry box 21.

The choice of the screens 43 and 45 is of importance in obtaining optimum results. The screen 43 is fabricated with a relatively coarse mesh from relatively large diameter filaments or yarns while the screen 45 is fabricated with a fine mesh from relatively small diameter filaments or yarns. In operation, when the screens are superposed, the fine mesh and the relatively small diameter filaments of the screen 45 provide a surface which is not subject to clogging with solid materials because particles cannot be readily become lodged in the openings of the screen and if they are, because of the small diameter filaments, it is not difficult to dislodge them because of a minimum entanglement with the filaments. Also, because of the small diameter of the filaments or yarns and the fine mesh, the void volume of the screen is minimized so that the screen 45 will hold a minimum amount of liquid which can be reabsorbed by the solid cake.

The coarse screen 43 with its relatively large diameter filaments or yarns provide the mechanical strength for drawing the superposed screens across the plate 23. Also, the cross overs of the filaments or yarns provide knuckles which minimize contact between the screen 43 and the plate 23 to reduce frictional forces. In addition, the knuckles also provide support for the screen 45 at spaced points which also minimizes the capillary effect between the screen 43 and 45, and permits the flow of water and air between the screen 45 and the perforated plate 23 over its area so that water and air can readily migrate to adjacent openings in the plate 23 and which minimizes the retention of liquid on the lower side of the screen 45.

Also, the combination of screens in cooperation with the press roll 85 provides a smooth surface on which the roll 85 bears and water which passes through the screen 45 readily flows through the screen 43 on to the roll 51 and because of the coarse mesh and the large filaments the screen 45 does not materially impede the flow of water along the surface of the roll 51.

It has been found that the fine screen 45 should be fabricated from filaments or yarns having a diameter of less than 10 mils and the open area should be less than 28 percent, preferably between about 14–25 percent and not preferably between about 18–20 percent. Under some conditions it may be desirable to provide a screen having a lesser open area than 14 percent. The Frazier air permeability of the screen 45 should preferably be between about 300 and 800 cu. ft./minute/sq. ft. at a pressure of one-half inch of water. While various weaves will give satisfactory results, the screen should preferably be woven with a satin weave. Such a weave provides elongated knuckles on opposite directions. It has been found that the fine screen 45 should be disposed so that the side of the screen having the majority of elongated knuckles in the machine direction should contact the cake. This decreases resistance to the doctor blade and also promotes peeling of the cake from the screen.

It has been found that the coarse screen 43 should be fabricated from filaments or yarns having a diameter of greater than 10 mils and the open area should be between about 12 to 25 percent, preferably between about 15 to 22 percent. The Frazier air permeability of the screen 43 should preferably be between about 300 and 800 cu. ft./minute/sq. ft. at a pressure of one-half inch of water. While various weaves will give satisfactory results the screen 43 should preferably be woven with a satin weave. Such a weave provides elongated knuckles on opposite sides of the screen which are primarily oriented in the opposite directions. It has been found that the coarse screen 43 should be disposed so that the side of the screen having a majority of elongated knuckles in the machine direction should be in contact with the plate 23. This decreases frictional resistance on the plate and places the majority of cross directional knuckles on both of the screens 43 and 45 in contact with one another to increase friction between the screens which facilitates movement through the apparatus.

In order to minimize capillary action, thereby minimizing liquid carried by the screens, and to minimize entanglement of particles with the screens, the screens should preferably be fabricated from monofilaments rather than from a multifilament yarn. Suitable materials for the monofilaments are nylon and polyester. It has been found that a coarse screen 43, as described above, provides substantial lateral flow through the screen so that any liquid forced or drawn through the screen 45 readily runs laterally through the screen 43 to the perforations 25 in the plate 23 or down the face of the roll 51 adjacent the nip between the rolls 51 and 85.

In order to minimize the tendency of the slurry in the slurry box 21 from running under the flexible strip 109 through the screens 43 and 45 openings provided by and to prevent the loss of vacuum through the screen 43, the lower screen 43 is provided with narrow, spaced apart transversely extending areas 149 which are impermeable to liquid. This can be accomplished by filling the openings in the screen 43 with molten polyethylene, polypropylene or the like or by applying a coating of latex or acrylic emulsion or the like to the areas to be sealed and curing the emulsion to make it insoluble.

The impermeable areas may be of narrow width, e.g. one-half inch and should be spaced apart a distance relative to the width of the strip 109 so that an impermeable area is under the strip 107 for a substantial portion of the width of the screen 45. It has been found that with a strip 107 which is almost six inches in width, the impermeable areas 149 can be approximate by ¼ to ½ inch in width and can be spaced approximately 5½ inches apart. To enhance the sealing action, the plate 23 preferably should be made imperforate under the strip 107 except towards the upstream end of the strip 107. As shown in FIG. 5 the plate 23 is imperforate under the strip 107 except along the marginal edge of the strip, the first row of perforations being indicated at 25a in FIG. 5. Thus, the source of vacuum is disposed as far as possible from the possible point of leakage but at the same time acts to hold the strip 107 in contact with the upper screen 45.

As shown, particularly in FIG. 3, the imperforate strip 149 are also preferably angled relative to the transverse dimension of the screen 43. This facilitates passage around the rolls and under the doctor blade 143. The exact angle is not critical but it preferably should be at least about 10° to the transverse dimension of the screen 43 to provide adequate tracking around the rolls and under the doctor blade 143. Depending upon the width of the strip 107 and the width of the screen 43, there may be a gap in the blockage action caused by the interaction of strips 149 with the sealing strip 107 but under most conditions the passageway provided between the point of leakage and the perforation 25 is so long that a resistance to air movement is set up which effectively minimizes any material leakage.

Similarly, as shown in FIG. 4, seals 152 are also provided along the side margins of the screen 43. The seals 151 are also imperforate strips which are preferably ¼ to ½ inch in width and which are made imperforate as described above in connection with imperforate strips 149. Again, the perforations 25 in plate 23 terminate in a position between the portion of the strip 151 and the marginal edge of sealing strip 101 as shown in FIG. 4 at 256, so that the action of the vacuum holds the flexible strip 101 against the screen and the strip 151 to provide a seal which effectively prevents leakage of vacuum and the slurry from bypassing the screens 43 and 45.

Tests were run on various coal slurries containing various amounts of solids in a system which included a coarse belt screen 43 which was fabricated from polyester monofilaments having 11 mil filaments running in the machine direction, the filament count across the machine being 55 filaments per inch and having 15 mil filaments running in the cross direction, the filament count in the machine direction being 36 filaments per inch. The open area was 16.7 percent and the Frazier air permeability was 532 cu. ft./minute/sq. ft. at a pressure of one-half inch of water. The screen 43 was woven with a satin weave with the filaments passing over three of the filaments in the opposite direction and under one filament. The screen 43 was oriented with the satin side, i.e. the side of the fabric in which the machine direction filaments pass over the cross direction filaments, in contact with the plate 23. This orientation of the screen provides what is in effect a series of longitudinally oriented elongated knuckles or bars which decrease the frictional force between the screen 43 and the plate.

The fine screen 45 was fabricated from polyester monofilaments having 7 mil filaments running in the machine direction, the filament count across the machine being 90 filaments per inch and having a 8 mil filaments running in the cross direction, the filament count in the machine direction being 50 filaments per inch. The open area was 21.1 percent and the Frazier air permeability was 640 cu. ft./minute/sq. ft. at a pressure of one-half inch of water. The screen 45 was woven with a satin weave in both directions with the filaments passing over three of the filaments in the opposite direction and under one filament. The screen 45 was oriented with the satin side, i.e. the side of the fabric in which the machine direction filaments pass over the three cross direction filaments, on the top to support the cake. This orientation of the screen provides what is in effect a series of longitudinally oriented knuckles or bars on the upper surface which provides a relatively smooth surface for the doctor blade 143 and which promoted release of the cake from the screen surface. Also, the orientation places the majority of cross direction filaments of both the screens 43 and 45 in contact which increases frictional forces between the screens 43 and 45 to aid in moving the screens in unison through the apparatus.

The vacuum box in the system was not provided with a partition but the slurry level was maintained about midway along the length of the vacuum box. The vacuum applied on various runs varied from 8 to 15 inches of mercury. The belt speed ranged from 7.5 to 10 ft. per minute. The nip pressure between the roll 85 and the roll 51 ranged between 12 and 35 pounds per lineal inch of nip in contact with the cake and the thickness of the cake ranged from ⅜ of an inch to one inch at the end of the vacuum box. The depth of cake increased substantially ahead of the nip between the rolls 51 and 85 which resulted in substantial working of the cake.

The various coal slurries which were tested involved varying type of coal solids in terms of size of particles, the mesh size varying considerably in each fraction. An example of one mesh size which shows, in general, the size range of particles in the ultimate cake is as follows:

| Mesh | Weight Percent |
|---|---|
| Plus 28 mesh | 8.33 |
| 28 × 48 mesh | 27.57 |
| 48 × 100 mesh | 27.12 |
| 100 × 200 mesh | 38.71 |
| 200 × 325 mesh | 7.27 |
| 325 mesh xo | 1.10 |
| | 100.00 |

The coal slurry treated was the underflow from a clarifier which contained approximately 42 percent solids. The final dewatered product taken from the rolls 51 and 85 contained between 18 and 25 percent moisture, the majority of the product on the various tests containing 20-22 percent moisture. This product could be mixed with outgoing coal without causing any serious problems so that the coverted waste product was transferred into a usable form of coal.

Surprisingly, the moisture content of the material passing through the nip was approximately 2-4 percent lower than the moisture content of the material on the screen at the point that it left the upstream end of the vacuum box, e.g. if the ultimate product had a moisture content of 21 percent, the moisture content at the upstream end of the vacuum box was between 23 and 25 percent.

The tests showed that little additional efficiency was obtained at vacuums over about 14 inches of mercury and that, depending upon the proportion of fines in the coal slurry, the pressures in the neighborhood of 25-30 pounds per linear inch at the press roll nip provided optimum results in terms of moisture removal as related to power consumption.

Similar tests were made on the protype equipment in connection with the recovery of coal refuse fines which is the material containing particles of slate, clay and the like which are cleaned and separated from the coal. An example of a fine refuse material containing clay and the like is as follows:

| Mesh | Weight |
|---|---|
| Plus 28 mesh | 24.45 |
| 28 × 48 mesh | 43.27 |
| 48 × 100 mesh | 12.23 |
| 100 × 200 mesh | 4.32 |
| 200 × 24 mesh | 14.92 |
| 325 mesh xo | .76 |
| | 100.00 |

Again, the conditions of operation were the same as the coal as described above and the material collected from the rolls 85 and 51 contained approximately 18-25 percent moisture and was of a consistency which could be disposed of in land fill.

In case of both the coal fines and refuse, the liquid which was separated contained a maximum of about 4 percent solids which was low enough so that the liquid could be returned for reuse in the washing plant.

Various features of the invention which are believed to be new are set forth in the appended claims.

What is claimed:

1. A system for separating solids from a slurry containing liquids and solids comprising in combination:
an elongated plate having spaced apart openings therethrough, said plate being disposed at an angle to the horizontal with one end higher than the other,
a first endless screen, said first screen being woven with a coarse mesh from filaments of relatively large diameter to provide knuckles,
one run of said first screen being trained over and supported for sliding movement on the upper surface of said plate from its lower end to its upper end,
a second endless screen, said screen being woven with a fine mesh from filaments of relatively small diameter to provide a low void volume and a relatively smooth surface,
one run of said second screen being supported upon the run of said first screen which is supported on said plate,
means for forming a pond of the slurry over a portion of the run of said second screen at its lower end,
means for moving said screens as a unit over said plate from its lower end toward its upper end including a first roll over which said screens are trained,
said first roll being disposed at the upper end of said plate,
a second roll engaging said screens on said first roll to form a nip, said nip being positioned upstream relative to the direction of movement of said screens from the highest point on said first roll,
means for biasing said first and second rolls together to apply pressure at said nip,
a vacuum chamber on the side of said plate opposite the side supporting said first screen, said vacuum chamber extending over the openings in said plate,
means for drawing a vacuum on said vacuum chamber, and
means for removing solids from the surface of said second roll and from said second screen.

2. The system of claim 1 wherein said vacuum chamber is divided into a plurality of sections at least one of which is located substantially under the openings in said plate under said pond and the other of which is substantially located under the openings in said plate outside of said pond and means independently connecting each of said sections to said source of vacuum.

3. The system of claim 1 or claim 2 wherein the means for forming said pond includes side walls which extend upwardly from said plate on opposite sides of said screens, said side walls being interconnected and the lower end of said plate by an upwardly extending end wall, an elongated strip of resilient material disposed along each of said side walls and overlying a marginal edge of said screen, each strip of resilient material having one of its marginal edges attached to said side wall and the other of its marginal edges overlying said screens and some of the openings in said plate, and another elongated strip of resilient material overlying said screens adjacent said end wall, one marginal edge of said other strip being attached to said end wall and the other marginal edge of said other strip overlying at least some of the openings in said plate whereby the vacuum in said vacuum chamber urges said resilient strips against said screens.

4. The system of claim 3 wherein said first screen is provided with longitudinally extending areas along each of its marginal edges the openings in said screen in such areas being rendered impermeable, said areas being disposed under said resilient strips and in the area between the openings in said plate and said side walls.

5. The system of claim 3 wherein longitudinally spaced apart transversely extending areas of narrow width are provided in said first screen, such areas being rendered impermeable, the spacing between such areas being correlated to the width of said other resilient strip so that said transversely extending areas effectively block passage of air and liquid under said other resilient strip.

6. The system of claim 3 wherein said first screen is provided with longitudinally extending areas along each of its marginal edges the openings in said screen in such areas being rendered impermeable, said areas being disposed under said resilient strips and in the area between the openings in said plate and said side walls, longitudinally spaced apart, transversely extending areas of narrow width are provided in said first screen, such areas being rendered impermeable, the spacing between such areas being correlated to the width of said other resilient strip so that said transversely extending areas effectively block passage of air and liquid under said other resilient strip.

7. The system of claim 3 wherein said first screen is provided with longitudinally extending areas along each of its marginal edges the openings in said screen in such areas being rendered impermeable, said areas being disposed under said resilient strips and in the area between the openings in said plate and said side walls, longitudinally spaced apart, transversely extending areas of narrow width are provided in said first screen, such areas being disposed at an acute angle to the transverse dimension of said first screen and being rendered impermeable, the spacing between such areas and the magnitude of said acute angle being correlated to the width of said other resilient strip so that said transversely extending areas effectively block passage of air and liquid under said other resilient strip.

8. A system for separating solids from a slurry containing liquids and solids comprising in combination:
an elongated plate having spaced apart openings therethrough, said plate being disposed at an angle to the horizontal with one end higher than the other,
a first endless screen, said first screen being woven with a coarse mesh from filaments of relatively large diameter with a satin weave to provide elongated knuckles on one side of the screen which are oriented in the machine direction of said first screen,
one run of said first screen being trained over and supported for sliding movement on the upper surface of said plate from its lower end to its upper end, the elongated knuckles oriented in the machine direction being in contact with said plate,
a second endless screen, said screen being woven with a fine mesh from filaments of relatively small diameter with a satin weave to provide elongated knuckles on one side of the screen which are oriented in the machine direction of said second screen,
one run of said second screen being supported upon the run of said first screen which is supported on said plate, the side of said second screen which includes the elongated machine direction knuckles being out of contact with first screen,
means for forming a pond of the slurry over a portion of the run of said second screen at its lower end,
means for moving said screens as a unit over said plate from its lower end toward its upper end including a first roll over which said screens are trained, said first roll being disposed at the upper end of said plate,
a second roll engaging said screens on said first roll to form a nip, said nip being positioned upstream relative to the direction of movement of said screens from the highest point on said first roll,
means for biasing said first and second rolls together to apply pressure at said nip,
a vacuum chamber on the side of said plate opposite the side supporting said first screen, said vacuum chamber extending over the openings in said plate,
means for drawing a vacuum on said vacuum chamber, and
means for removing solids from the surface of said second roll and from said second screen.

9. The system of claim 8 wherein the first screen if fabricated from monofilaments which are over 10 mils in diameter, said first screen having an open area of about 12 to 25 percent and having Frazier air permeability of between about 300 and 800 cubic feet/minute/square foot at a pressure of one-half inch of water and the second screen if fabricated from monofilaments which are under 10 mils in diameter, said second screen having an open area of less than about 28 percent and a Frazier air permeability of from about 300 to 800 cubic feet/minute/square foot at a pressure of one-half inch of water.

* * * * *

UNITED STATES PATENT OFFICE
CERTIFICATE OF CORRECTION

Patent No. 4,285,816　　　　　　　　　Dated August 25, 1981

Inventor(s)　　Charles A. Lee

It is certified that error appears in the above-identified patent and that said Letters Patent are hereby corrected as shown below:

Column 8, line 3, "152" should be -- 151 --.

Column 8, line 53, "promoted" should be -- promotes --.

Column 9, line 28, "coverted" should be -- converted --.

Column 9, line 58, (chart) - "200 X 25 mesh" should be

-- 200 X 325 mesh --.

Signed and Sealed this

Seventeenth Day of November 1981

[SEAL]

Attest:

Attesting Officer

GERALD J. MOSSINGHOFF

Commissioner of Patents and Trademarks